Aug. 22, 1950

E. C. WELLS 2,519,522

AIRCRAFT HAVING A PLURALITY OF FLUIDLY
INTERCONNECTED LATERALLY DISPOSED
LANDING GEAR UNITS

Filed Jan. 29, 1946

INVENTOR.
Edward C. Wells
BY
HIS PATENT ATTORNEY

Patented Aug. 22, 1950

2,519,522

UNITED STATES PATENT OFFICE 2,519,522

AIRCRAFT HAVING A PLURALITY OF FLUIDLY INTERCONNECTED LATERALLY DISPOSED LANDING GEAR UNITS

Edward C. Wells, Seattle, Wash., assignor to Boeing Airplane Company, a corporation of Delaware Application January 29, 1946, Serial No. 644,054

10 Claims. (Cl. 244—100)

The present invention relates to improvements in aircraft landing gears.

In the design and construction of relatively large and heavy aircraft of the land type, many problems are presented in the provision of a suitable landing gear. It is an essential requirement that the landing gear be properly positioned with respect to the aircraft structure in order to absorb and distribute the impacts and shocks due to landing and taxiing, as well as to prevent the imposition of excessive loads upon the various portions of the aircraft structure either during the aforesaid operations or while the airplane is at rest upon the ground. It is also extremely essential that the loads to which airports and runways are subjected be kept within reasonable limits and at the present time many commercial airport landing surfaces are not capable of withstanding the concentrated loads of the large military aircraft now in use.

The present invention is directed to improved arrangements of the landing gear units with respect to the fuselage and wings of the aircraft as a result of which the loads upon these components are substantially reduced. It also reduces the concentration of these loads on both the aircraft structure and the landing surface. It is also directed to a cooperative equalizing relationship between a plurality of landing gear units whereby excessive loads are prevented upon the individual units and all of the units in a set are arranged to cooperate in the absorption of landing and taxiing shocks. It is known that efforts have previously been made to equalize the loads between pairs of landing gear units but no known prior arrangements are adapted to solve the problems or to accomplish the results to which the plural landing gear units of the present invention have been directed.

My improved arrangement of multiple landing gear units consists essentially in the disposition of at least three landing gear units disposed substantially along a spanwise or lateral line and symmetrically arranged with respect to the fuselage. It is in effect a tripartite landing gear in which the main landing wheel units of either a tricycle landing gear, or the heretofore conventional tail wheel type landing gear, are disposed along a lateral line with respect to the longitudinal axis of the aircraft. As a result of such an arrangement the loads upon both the airplane and its landing surface have been materially reduced and the landing gear units, including the struts and wheels, may be made appreciably smaller.

It is accordingly a major object of the present invention to provide an improved tripartite landing gear for relatively large or heavy aircraft. It is another object to provide a landing gear arrangement for such aircraft in which the stability while taxiing is materially increased and the stiffness of the several landing gear shock absorbers is equalized for taxiing purposes. A further object of the invention is to provide an improved landing gear arrangement in which the wings of the aircraft need not be constructed of such strength as to carry the fuselage load during landing and taxiing operations or while the airplane is at rest upon the ground. Another object is the provision of a landing gear in which the loads upon both the aircraft structure and the airport surface are less concentrated and are accordingly reduced. A further object resides in permitting the use of much smaller landing gear components such as struts, wheels, tires and brakes.

It is a further object of the present invention to provide an improved disposition of the landing gear units with respect to the wing span of an aircraft whereby the loads transmitted into, or the stresses developed within, each wing are materially reduced. A further object lies in the provision of a landing gear arrangement wherein impacts and shocks imparted heretofore to a single landing gear unit are distributed between two or more landing gear units with a corresponding reduction in the magnitude of the forces to which the supporting structure is subjected.

Other objects and advantages of the present invention both with respect to its general arrangement and the details of its several parts, will become apparent to those skilled in the art after a reading of the present specification together with the accompanying drawings forming a part hereof, in which:

Fig. 2 is a side elevation of the airplane shown in Fig. 1 and its relationship to the ground;

Figure 1:
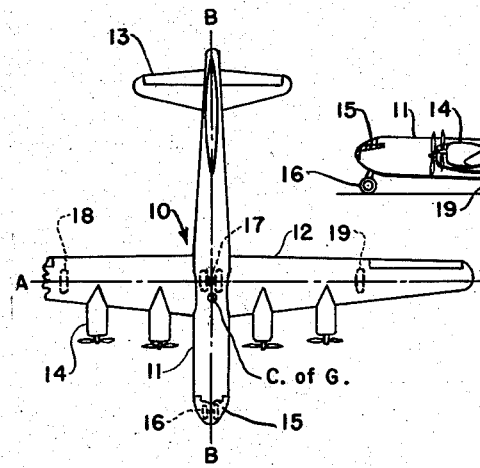
Fig. 1 is a plan view of a large airplane showing an adaptation of my invention thereto with a landing gear of the tricycle or nose wheel type.
Figure 3:
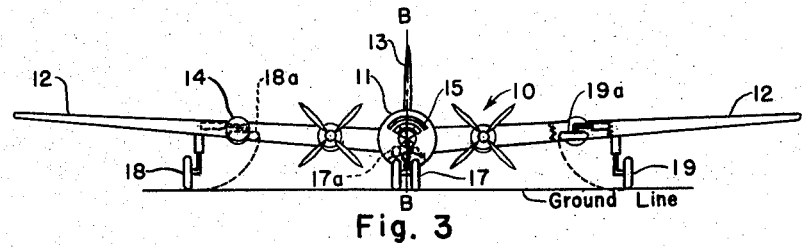
Fig. 3 is a front elevation to a somewhat larger scale of the airplane illustrated in Figs. 1 and 2.

Referring now to Figs. 1, 2 and 3, there is shown a large airplane 10 having a fuselage 11, wings 12 and an empennage 13, all of which may be of conventional or known design. The airplane 10 is also preferably provided with a plurality of power plant and propeller units 14 for its propulsion as well as a control compartment 15 in the nose portion from which it may be controlled.

The airplane 10 is provided with a nose wheel landing gear unit 16 for the support of the nose portion of the fuselage, and rearwardly or aft of the center of gravity, indicated at C. of G. in Fig. 1, is provided with a tripartite landing gear arrangement of the present invention comprising the central landing gear unit 17 and the two outboard units 18 and 19. The central unit 17 is preferably attached to the lower portion of the fuselage symmetrically disposed with respect to the longitudinal vertical plane of symmetry of the aircraft as indicated by the lines B—B, about which the nose wheel unit 16 is also preferably symmetrically disposed. The outboard landing gear units 18 and 19 are each supported from the structure of the wings 12 and preferably lie along a transverse line A—A which also preferably passes through the central unit 17. Portions of the wings and fuselage have been broken away in Fig. 3 to facilitate showing the tripartite landing gear units.

It will be noted that the airplane 10 shown in Figs. 1, 2 and 3, having its center of gravity disposed forward of the main landing gear units and consequently aft of the nose wheel unit, is one of the so-called tricycle landing gear type. Normally, however, a tricycle landing gear arrangement for such an airplane would comprise a pair of divided main landing wheels located behind the C. of G. and attached to the wing structures approximately in the region of the inboard engine nacelles 14. The tripartite landing gear of the present invention comprises a major central unit 17 of sufficient size to carry the greater portion of the fuselage and wing loads, and the pair of substantially lighter outboard or stabilizing units 18 and 19, which are preferably disposed at substantially the midpoint of each wing 12, between the fuselage and its tip portion. Inasmuch as the outboard landing gear units 18 and 19 are required to support only the weight and load of the outer wing portions, these units may be relatively lighter and the loads are of a magnitude which is readily accommodated by the lighter section of the wing construction at their points of attachment.

While the landing gear units shown and described herein for explanatory purposes are of the single and dual pneumatic wheel type, it will be apparent that this invention is equally applicable to skids, skis, multiple wheels, endless belts, or other ground-engaging members. The language "landing gear unit" as used herein will accordingly be understood to represent a single ground-engaging assembly whether comprising single or dual wheels or other ground-engaging devices. The airplane 10 as shown in Fig. 2 while normally supported upon the ground by the nose wheel 16 and the tripartite units 17, 18 and 19, might preferably be provided with a tail skid 20 for the protection of the aft end of the fuselage against dropping as the result of loading, or landing, or other conditions in which the C. of G. might be moved aft of the vertical plane of contact A—A of the main tripartite landing gear.

It will be noted from Fig. 3 that each of the tripartite landing gear units 17, 18 and 19 is preferably retractable into their dotted line positions in order to reduce the drag or resistance of the airplane in flight. The main central unit 17 is preferably retractable vertically into the fuselage 11 as indicated by the dotted lines 17a, and each of the outboard units 18 and 19 is preferably retracted laterally into the structure of the wing 12 as indicated by the dotted lines 18a and 19a. It is to be noted, however, that while retractable landing gears are generally preferable the present invention is not dependent upon the retraction of the unit and is equally applicable to landing gears of the fixed type.

Figure 4:
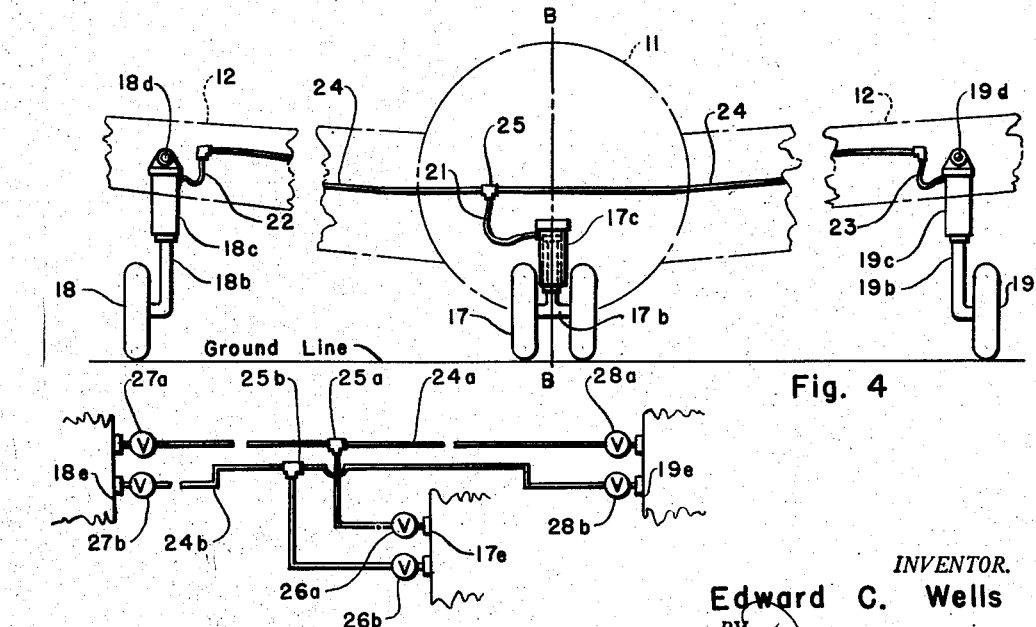
Fig. 4 is a front elevation to a still larger scale of the landing gear and equalizing equipment of the airplane shown in Fig. 3.

Referring now to Fig. 4, there is shown an equalizing arrangement interconnecting the fluid spaces of the shock absorbers of the units 17, 18 and 19 whereby the loads imposed upon the landing gear units and the aircraft structure are substantially reduced and materially distributed. The central fuselage unit 17 preferably comprises a piston member 17b upon which the dual wheels are rotatively mounted and a cylinder member 17c which is preferably attached to the aircraft. Similarly the outboard units 18 and 19 comprise wheel-carrying piston members 18b and 19b and cylinder members 18c and 19c, respectively. These latter cylinder members have been indicated as pivotally mounted at 18d and 19d upon the aircraft structure and about which they may be rotatively retracted. Flexible pressure connections 21, 22 and 23 connect the upper spaces of the cylinders 17c, 18c and 19c, respectively, with a pressure conduit 24 which extends across the aircraft, and through the fuselage 11, adjacent which a fitting 25 is provided for the connection 21 to the cylinder 17c of the central unit. These flexible connections are made to each shock absorbing cylinder at points above the normal upper limit of travel of the piston such that these connections are always open to the fluid pressure, which may either be hydraulic or pneumatic, which is developed within the upper portion of each cylinder.

It will accordingly be seen that the flexible connections and the conduit 24 will have the effect of equalizing the pressures which may be developed in the cylinder of each landing gear unit as a result of irregular landing, loading, taxiing, contour of the landing surface or other conditions. Accordingly as a heavy airplane, of the type shown and as contemplated herein, might be taxied over an irregular landing field any obstruction or irregularity which may subject any one of the landing gear units to an increased load will be distributed to a greater or lesser extent to the remaining units by the fluid pressures which are developed within the cylinder of the unit subjected to the increased load, and transmitted through its flexible connection into the equalizing line and the connections to the other units.

Obviously only a portion of this increased load will be transmitted through the connection of the particular unit subjected to such load by contact with the ground, and the remainder of the increase transmitted to its attachment to either the fuselage or wing structure. This distribution and equalization of the loads has the effect of reducing the magnitude of the stresses to which the wings and fuselage of the airplane are subjected as well as to materially increase the stability of the airplane while it is being taxied along the ground. It also serves to reduce the load upon the landing surface. This equalization has the additional effect of conditioning the stiffness of the respective shock absorbers for taxiing conditions in order that each presents the required stiffness under varying load conditions. It has the further advantage that the wings of the airplane need not be built so heavy or strong enough as to carry the fuselage loads during taxiing.

Figure 5:
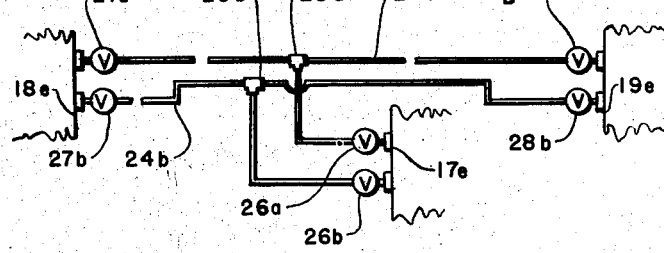
Fig. 5 shows a diagrammatic view of a modified form of the equalizing conduits between the respective landing gear units.

Referring now to Fig. 5 there is shown in diagrammatic form an arrangement wherein two equalizing lines 24a and 24b serve to interconnect the cylinder portions 17e, 18e and 19e of the central and outboard landing gear units respectively. At the connections of the equalizing lines to the respective cylinders automatic check and cut-off valves 26a and 26b; 27a and 27b; and 28a and 28b are provided in order to forestall the failure of the landing gear by rupture of either interconnecting conduit. These cut-off valves are the type which remain open and permit the passage of a normal flow of fluid therethrough, but when the flow exceeds a predetermined magnitude the valve automatically shifts to its closed or checked position in which further outward flow from either of the cylinder portions is prevented until the valve is reset and the rupture on the outlet side of the valve repaired. As in the modification shown in Fig. 4, the leads from the central cylinder 17c join the respective equalizing lines at the T fittings 25a and 25b and each of these several leads is controlled by a check and cut-off valve in such manner that should one equalizing line be ruptured its respective cut-off valves would close to prevent escape of the air or fluid from the shock absorber, yet the other line would remain open to provide the necessary intercommunication between the shock absorbing cylinders.

Figure 6:
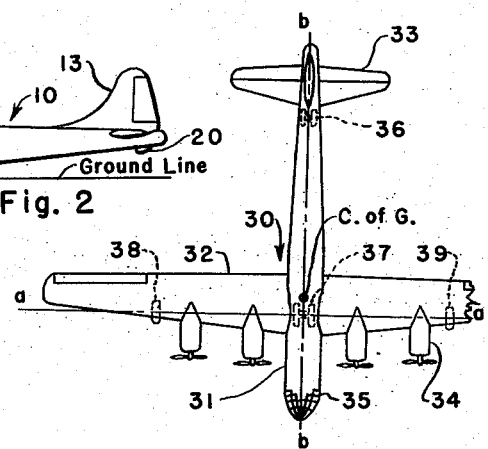
Fig. 6 shows a plan view of an airplane of similar size to which my improved landing gear arrangement of the tail wheel type is applied.

Fig. 6 shows a plan view of an airplane 30, which differs essentially from the airplane shown in Figs. 1 to 3 inclusive, in that its center of gravity is disposed somewhat farther aft and the landing gear of this airplane would normally be of the heretofore conventional or tail wheel type. The airplane 30 is comprised of a conventional fuselage 31, wings 32, empennage or tail group 33 and a plurality of power plant and propeller propulsion units 34. A conventional control compartment 35 is provided in the nose portion of the fuselage 31 for the operating personnel.

The landing gear of the airplane 30 shown in Fig. 6 comprises a main central landing gear unit 37 and a pair of outboard or stabilizing landing gear units 38 and 39 attached to the wing portions 32. A tail wheel unit 36 is provided for the support of the aft portion of the fuselage in the region of its empennage 33. As in the case of the tricycle type landing gear referred to above, the main landing gear units 37, 38 and 39 of the airplane 30 are also preferably arranged laterally along the transverse axis a—a and the main or central unit 37 preferably disposed upon or symmetrically about the longitudinal plane of symmetry of the airplane as defined by the axis b—b about which the tail wheel unit is also symmetrically disposed.

While it is preferable that the landing gear units 17, 18 and 19 or 37, 38 and 39 all be in the same line or plane A—A or a—a transversely of the aircraft, this need not exactly be the case, but the central wheels 17 or 37 should not be sufficiently out of line with respect to the outboard wheels 18 and 19 or 38 and 39 such that the central wheels in either case take the place of either a nose wheel or a tail wheel, depending upon the general type of landing gear which is employed. It will also be understood that the arrangement and details of the landing gear comprised of units 37, 38 and 39 can be similar in all other respects to the landing gear comprised of units 17, 18 and 19 as described in connection with the first five figures of the drawings.

In each of the foregoing modifications the central landing gear units 17 and 37 are of relatively heavy construction and will take the major portion of the load so that the wings need not be built strong enough to carry the landing load of the fuselage. Additionally the load on each wing is decreased by locating the outboard units 18 and 19, and 38 and 39, generally midway between the wing tip and fuselage. Without the equalizing means disclosed herein, either of these outboard wheels could not be depended upon entirely in the event the airplane should be landed with one wing down sufficiently such that the other outboard wheel on the high wing side would not touch the ground initially. In prior landing gears of the conventional type the single divided unit beneath the low wing would take the entire landing shock, whereas in the present improved tripartite landing gear the low outboard unit as well as the main central unit will cooperate in taking the landing shock together. The shock absorbing resistance of the low outboard unit of the present landing gear which strikes the ground first in landing would not be sufficient such that a major portion of the load could be assumed by it, but contact of this wheel and the restriction to the flow of the fluid displaced by its shock absorber piston would afford sufficient resistance to level the airplane promptly and to bring the central landing gear unit into contact with the ground. As the airplane continues to taxi along the ground the cushioning effect of all three laterally disposed units is made uniform by the equalizing line 24 interconnecting the respective cylinder elements, and the stability while taxiing is thereby materially increased by the varying stiffness of the several shock absorbers.

Further advantages and uses of the present invention which may occur to those skilled in the art after reading the foregoing description and drawings are intended to come within the scope and spirit of this invention as more particularly set forth in the appended claims.

I claim:

1. A landing gear arrangement for an airplane having a fuselage and a pair of laterally extending wings, a major central landing gear unit attached to the fuselage, a pair of outboard stabilizing landing gear units each attached to its respective wing and disposed laterally with respect to said central unit, each said landing gear unit including a piston-cylinder type hydraulic shock absorber, a hydraulic fluid conduit interconnecting the cylinders of each said shock absorber arranged in such manner that each of said laterally disposed units absorbs a predetermined portion of the laterally distributed load of the airplane while at rest upon the ground, cut-off valve means interposed within said fluid conduit adjacent its connection to said cylinders arranged to prevent loss of fluid from said cylinders in the event of rupture of said fluid conduit at rates of fluid flow beyond the normal equalizing flow between said shock absorber units, and a further central landing gear unit longitudinally disposed with respect to said major central unit for absorbing a portion of the longitudinally distributed load of the airplane while at rest upon the ground.

2. The combination with an airplane having a fuselage, relatively fixed wings extending laterally therefrom, a central landing gear unit attached to said fuselage, an outboard stabilizing landing gear unit attached to each said wing, said central and outboard landing gear units disposed along substantially the same transverse plane with respect to said airplane, and hydraulic shock absorbers associated with each said landing gear unit, of hydraulic conduit means interconnecting each of said landing gear units arranged to hydraulically equalize the loads imposed thereon for the lateral stabilization of the airplane while landing and moving along the ground.

3. A landing gear arrangement for an airplane having a fuselage and a pair of laterally extending wings, a major central landing gear unit attached to the fuselage, an outboard stabilizing landing gear unit attached to each wing, said main and stabilizing landing gear units disposed along a lateral line with respect to the airplane for the lateral stability thereof, each said landing gear unit including a piston-cylinder type shock absorber and a fluid conduit interconnecting the cylinders of each said shock absorber arranged to equalize the loads between said major central and outboard stabilizing landing gear units, and a further central landing gear unit attached to the fuselage and longitudinally spaced from said first said major central landing gear unit to cooperate therewith in improving the longitudinal stability of the airplane upon the ground.

4. A landing gear arrangement for an airplane having a fuselage and a pair of laterally extending wings, a major central landing gear unit attached to the fuselage, an outboard stabilizing landing gear unit attached to each wing and disposed along a lateral line with respect to said major central unit, each said laterally disposed landing gear unit including a piston-cylinder type shock absorber, a fluid conduit interconnecting the cylinders of each said shock absorber arranged in such manner that each of said laterally disposed units absorbs a predetermined portion of the laterally distributed loads of the airplane while it rests upon the ground, and a further central landing gear unit unconnected with said fluid conduit tandemly disposed and cooperating with said major central landing gear unit in absorbing the longitudinally distributed load of said airplane while it rests upon the ground.

5. A landing gear system for an airplane having a longitudinal plane of symmetry including the center of gravity of the airplane and a transverse plane normal to said plane of symmetry and longitudinally spaced from the center of gravity, a pair of main landing gear units tandemly disposed along said plane of symmetry with one unit forward and the other unit aft of said center of gravity, a pair of secondary landing gear units laterally disposed one on each side of said plane of symmetry, said secondary landing gear units and one of said main units disposed along said transverse plane, and load equalizing means interconnecting said three-laterally disposed landing gear units for the lateral stabilization of said airplane.

6. A landing gear system for an airplane having a longitudinal plane of symmetry including the center of gravity of the airplane and a transverse plane normal to said plane of symmetry and longitudinally spaced from the said center of gravity, a pair of main landing gear units tandemly disposed along said plane of symmetry with one unit forward and the other aft of said center of gravity and with one of said units disposed appreciably nearer said center of gravity than the other unit, and a pair of secondary landing gear units laterally disposed one on each side of said plane of symmetry, said secondary landing gear units and the nearer of said main landing units to said center of gravity disposed along the same said transverse plane, and fluid conduit interconnections provided between said secondary landing gear units and the nearer of said main landing gear units for the lateral stabilization of said airplane.

7. A landing gear system for an airplane having a longitudinal axis comprising a pair of main landing gear units tandemly disposed along said longitudinal axis and a pair of secondary landing gear units laterally disposed one on each side of said longitudinal axis, said secondary landing gear units and one of said main landing gear units disposed along the same transverse plane normal to said longitudinal axis for the lateral stabilization of said airplane, and hydraulic conduit means interconnecting said three-landing gear units disposed along the same transverse plane for the lateral stabilization of said airplane and the transmission of equalizing forces in the transverse plane only, said pairs of main and secondary landing gear units comprising the sole support of the airplane while at rest upon the ground.

8. A landing gear system for an airplane having a longitudinal axis, a pair of main landing gear units tandemly disposed along said longitudinal axis, a pair of secondary landing gear units laterally disposed one on each side of said longitudinal axis, said secondary landing gear units and one of said main landing gear units disposed along the same transverse plane normal to said longitudinal axis, hydraulic shock absorbers associated with each of said landing gear units, and conduit means interconnecting the hydraulic shocks absorbers of only said three landing gear units disposed along the same transverse plane for the lateral stabilization of said airplane and the transmission of equalizing forces between said three shock absorbers in the said transverse plane only.

9. A landing gear arrangement for an airplane having a fuselage and a pair of laterally extending wings fixedly attached to the fuselage, said landing gear arrangement comprising a major central landing gear unit attached to the fuselage, a pair of outboard stabilizing landing gear units attached to its respective wing and laterally disposed with respect to said central landing gear unit, each said landing gear unit including a piston-cylinder type hydraulic shock absorber, a hydraulic fluid conduit interconnecting the cylinder of each said shock absorber arranged to equalize the laterally distributed loads of the airplane between said shock absorber units, a further central landing gear unit longitudinally disposed with respect to said major central landing gear unit and automatic valve means disposed within said hydraulic fluid conduit adjacent each said shock absorber unit arranged to prevent hydraulic fluid flow from either said shock absorbing cylinder in the event of rupture of said hydraulic fluid conduit between said automatic valve means.

10. In an airplane having a fuselage, laterally extending wings fixedly attached thereto, and a landing gear comprising a main central unit attached to the fuselage, a pair of outboard stabilizing units attached to the mid-span portions of the wings in a laterally aligned disposition with respect to said central unit, and fluid shock absorbers associated with each of said three laterally aligned units, the improvement of fluid equalizing means interconnecting the shock absorbers of each said laterally disposed stabilizing unit and said main central unit arranged to distribute excess loads imposed upon either one of said laterally disposed stabilizing units among the two other said laterally disposed units.

EDWARD C. WELLS.

REFERENCES CITED

The following references are of record in the file of this patent:

UNITED STATES PATENTS

| Number | Name | Date |
| --- | --- | --- |
| 1,541,957 | Hooper | June 16, 1925 |
| 1,847,491 | Messier | Mar. 1, 1932 |
| 1,981,856 | Downey | Nov. 27, 1934 |
| 2,110,865 | Burgess | Mar. 15, 1938 |
| 2,368,855 | Levy | Feb. 6, 1945 |

FOREIGN PATENTS

| Number | Country | Date |
| --- | --- | --- |
| 510,164 | Great Britain | July 27, 1939 |
| 746,073 | France | Feb. 27, 1933 |
| 819,026 | France | June 28, 1937 |